US010343583B1

(12) United States Patent
Moravec

(10) Patent No.: US 10,343,583 B1
(45) Date of Patent: Jul. 9, 2019

(54) TRUCK BED FOR PORTABLE TOILET DELIVERY TRUCKS

(71) Applicant: Lawrence M. Moravec, Webster, NY (US)

(72) Inventor: Lawrence M. Moravec, Webster, NY (US)

( * ) Notice: Subject to any disclaimer, the term of this patent is extended or adjusted under 35 U.S.C. 154(b) by 223 days.

(21) Appl. No.: 15/349,314

(22) Filed: Nov. 11, 2016

Related U.S. Application Data

(60) Provisional application No. 62/254,902, filed on Nov. 13, 2015.

(51) Int. Cl.
*B60P 3/22* (2006.01)
*B62D 33/02* (2006.01)

(52) U.S. Cl.
CPC .......... *B60P 3/2235* (2013.01); *B60P 3/2225* (2013.01); *B60P 3/2255* (2013.01); *B62D 33/02* (2013.01)

(58) Field of Classification Search
CPC .... B62D 33/033; B60P 3/2225; B60P 3/2205; B60P 3/2235; B60P 3/2265; B60P 3/2255; B60P 3/22
USPC .............. 296/183.1, 184.1, 32; 280/830, 831
See application file for complete search history.

(56) References Cited

U.S. PATENT DOCUMENTS 1,400,345 A * 12/1921 Brile ........................ B60P 3/426 220/DIG. 24
2,474,094 A * 6/1949 Colquitt .................. B60P 3/426 220/DIG. 24
4,028,256 A * 6/1977 Pielkenrood ....... B01D 17/0211 210/519
6,598,242 B1 * 7/2003 Denome ................ A47K 11/00 137/899
6,723,173 B1 * 4/2004 Golladay ............... A47K 11/00 134/21
7,192,060 B2 * 3/2007 Warrick .................... B60P 3/22 280/831

* cited by examiner

*Primary Examiner* — Dennis H Pedder
(74) *Attorney, Agent, or Firm* — John J. Elnitski, Jr.

(57) ABSTRACT

A truck bed having a flat bed deck adapted for mounting on a truck to haul cargo and a tank within the deck adapted for containing and hauling liquid. The deck includes a top plate, bottom plate, front end, rear end and sides. The sides are connected between outer edges of the front end and rear end. The top plate is connected to the front end, rear end and sides. The bottom plate is connected to the front end, rear end and sides. A tank is formed by the top plate, bottom plate, front end, rear end and sides, whereby the sides are connected in a seal state for holding the liquid.

6 Claims, 7 Drawing Sheets

12
10
14
36
20
28
32
34
24 SHOWN WITH TOP FLOOR REMOVED
22

12
24
14
26
28
30
30
REAR VIEW
22
24

TRUCK BED FOR PORTABLE TOILET DELIVERY TRUCKS

This application claims the benefit of and incorporates by reference U.S. Provisional Applications No. 62/254,902, filed Nov. 13, 2015.

BACKGROUND

The present invention generally relates to portable toilet delivery trucks. More specifically, the present invention relates to a truck bed for portable toilet delivery trucks.

A typical truck bed for portable toilet delivery trucks is a flat bed for hauling the portable toilets. The trucks include a water tank loaded on the flat bed or positioned between the cab of the truck and the flat bed. In either case, the water tank takes up room that can be used to haul more portable toilets, either by being on the flat bed or requiring a shorter flat bed to leave space between the cab and flat bed. What is needed is a flat bed which can hold water and provide maximum room for portable toilets.

It is an object of the present invention to provide a flat bed which can hold water and provide maximum room for portable toilets.

SUMMARY

A truck bed having a flat bed deck adapted for mounting on a truck to haul cargo and a tank within the deck adapted for containing and hauling liquid. The deck includes a top plate, bottom plate, front end, rear end and sides. The sides are connected between outer edges of the front end and rear end. The top plate is connected to the front end, rear end and sides. The bottom plate is connected to the front end, rear end and sides. A tank is formed by the top plate, bottom plate, front end, rear end and sides, whereby the sides are connected in a seal state for holding the liquid.

DETAILED DESCRIPTION

Figure 1:
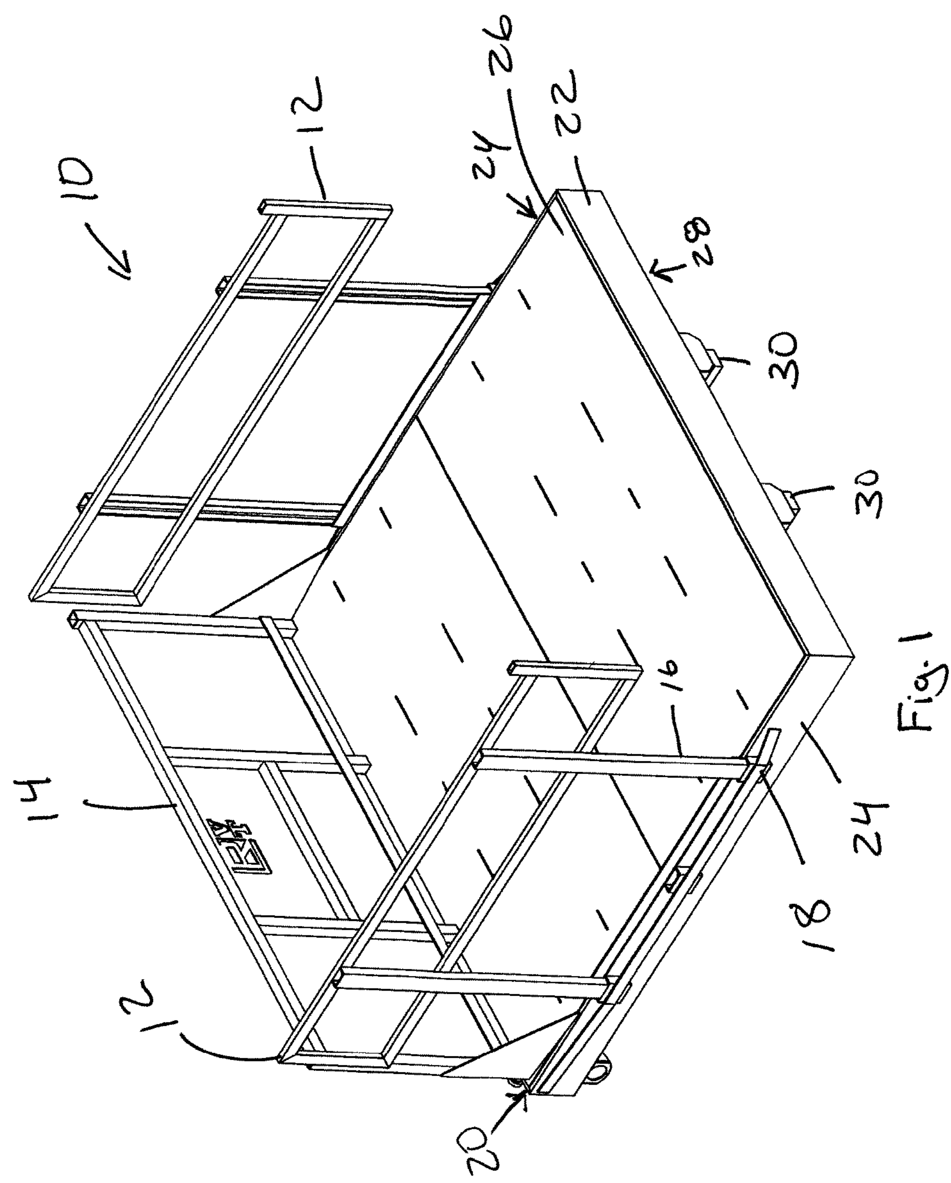
FIG. 1 is a perspective view of a truck bed according to the present invention.

The present invention is a water supply tank for portable toilet delivery trucks, as show in FIGS. 1-7. A truck bed 10 is shown in FIG. 1. The truck bed 10 includes side rails 12 and a front bulkhead 14. The side rails 12 and front bulkhead 14 are used to restrain cargo such as portable toilets on the bed 10. The side rails 12 include posts 16 which insert into post holders 18 attached to the bed 10, making the side rails 12 removable. The front bulkhead 14 is permanently attached to the front of the bed 10. The bed 10 includes a front end 20, rear end 22 and sides 24. The bed 10 includes a top plate 26 and a bottom plate 28. The bed 10 includes truck rails 30 for mounting the bed 10 to a truck. The front end 20, rear end 22, sides 24, top plate 26 and a bottom plate 28 of the bed 10 assembled in a sealed state to form a tank for holding liquid such as water.

Figure 2:
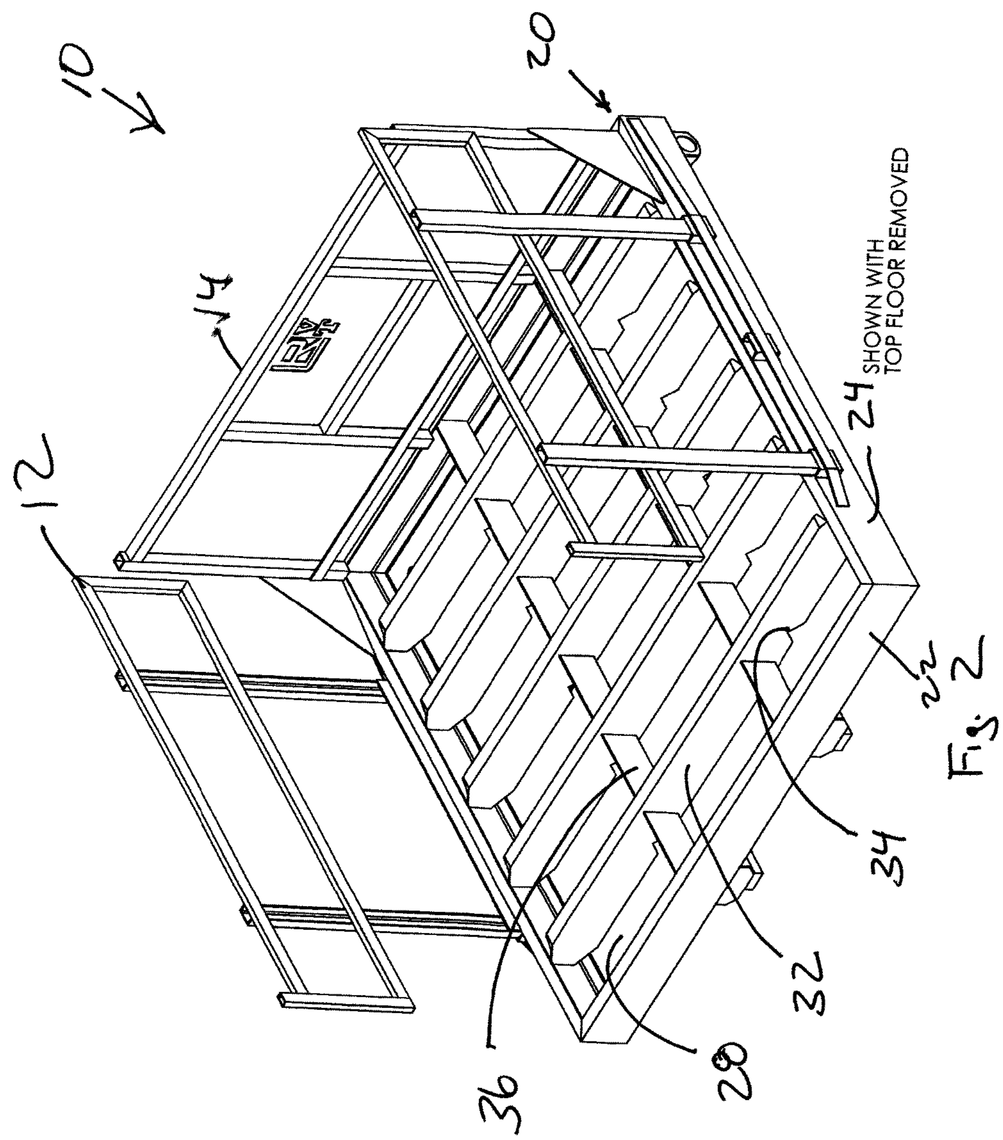
FIG. 2 is a perspective view of a truck bed according to the present invention.
Figure 6:
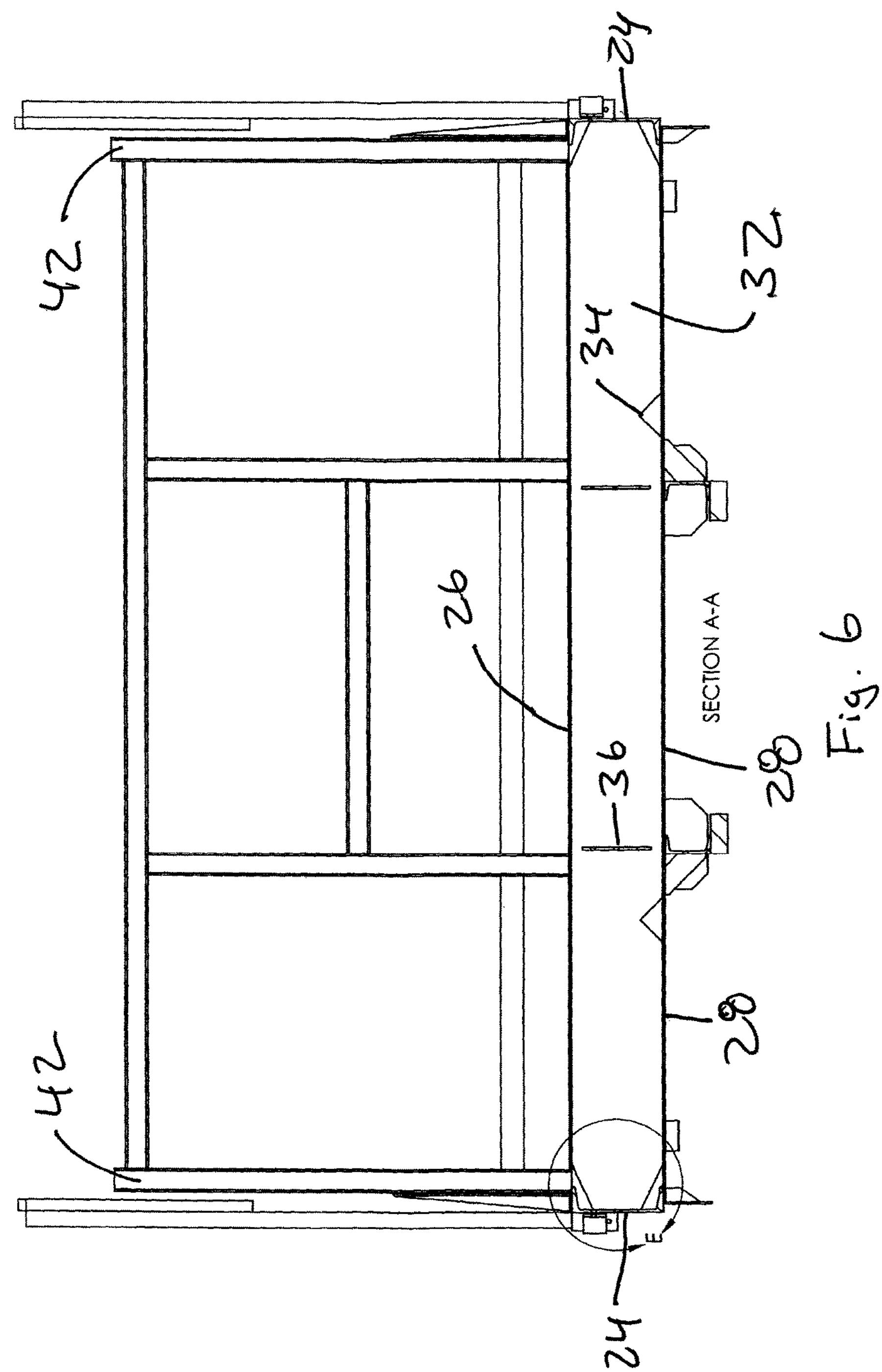
FIG. 6 is a front view of a truck bed according to the present invention.
Figure 7:
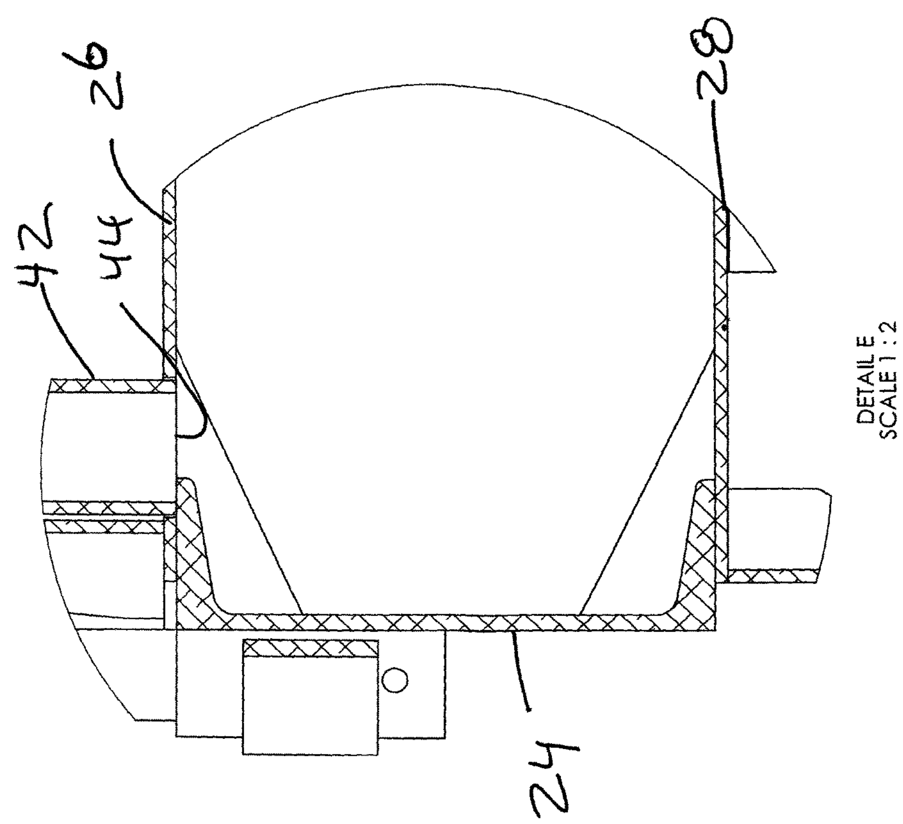
FIG. 7 is an side view of a vent according to the present invention.

FIG. 2 shows the top plate 26 removed. Within the tank that is formed are baffles 32 that run between the sides 24. The baffles 32 have two purposes. The baffles 32 are attached to the top plate 26, bottom plate 28 and sides 24 to act as cross members to support the top plate 26 of the bed 10 and load on the top plate 26. The baffles 32 include flow notches 34 at the bottom of the baffles 32. The flow notches 34 are shown in the shape of a triangle or V. The flow notches 34 can be of any shape. The flow notches could also be replaced with cutouts within the baffles 32. The baffles 32 prevent radical movement of the liquid that could cause a load shift. Whereby, a load shift is a dangerous situation, when driving a truck during the load shift. FIG. 2 also shows cross baffling members 36 that run from front end 20 to rear end 22. The cross baffling members 36 are attached between the baffles 32. The cross baffling members 36 do not touch the bottom plate 28 or top plate 26, as shown in FIG. 6. This leaves a gap between the bottom plate 28 and top plate 26, so that the liquid can move along the gaps between the cross baffling members 36 and the bottom plate 28 or top plate 26.

Figure 3:
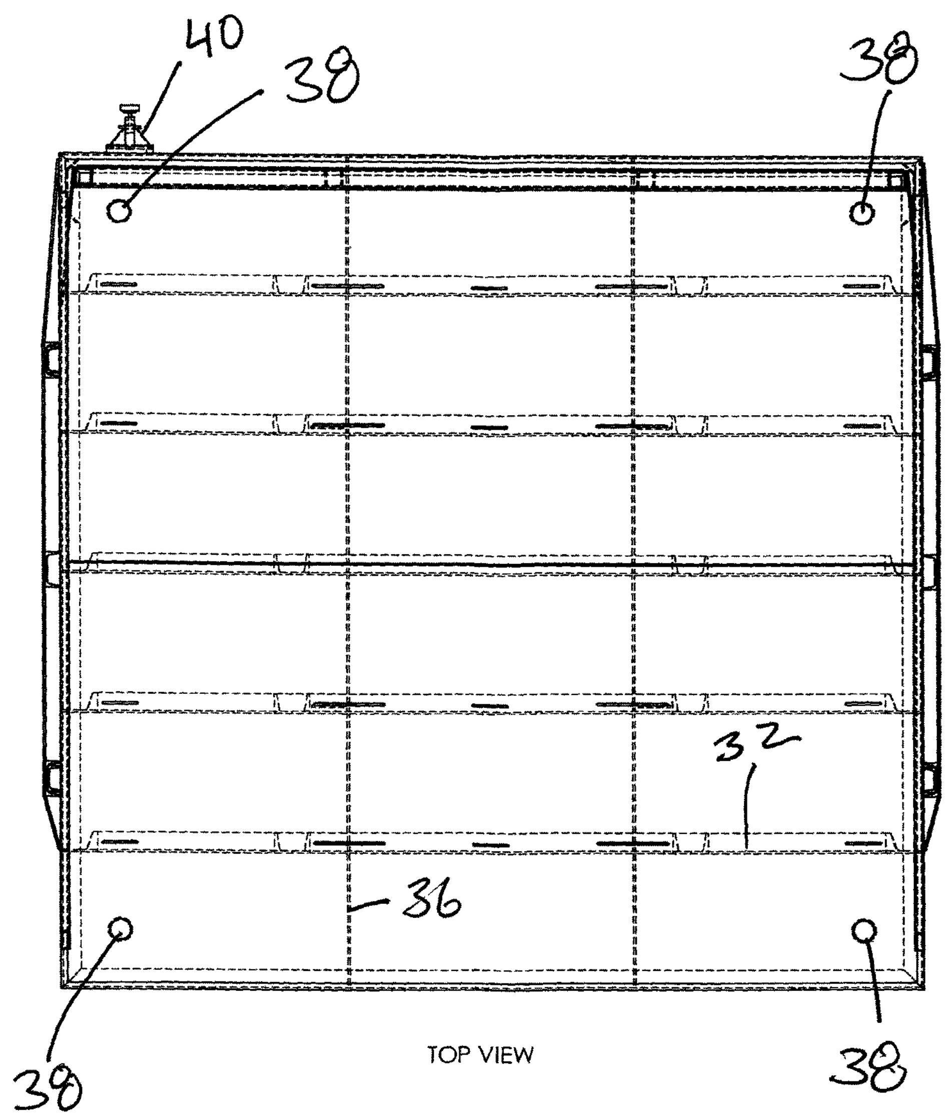
FIG. 3 is a top view of a truck bed according to the present invention.

FIG. 3 shows a top view of the bed 10. FIG. 3 shows four liquid access holes 38 in the bottom plate 28 of the bed 10. The liquid access holes 38 are plugged to hold the liquid in the bed 10. One of the liquid access holes 38 can be opened to allow removal or addition of liquid. To remove liquid, the liquid access hole 28 would be unplugged and the liquid will flow out under the influence of gravity. A hose can be attached to the liquid access hole 38 to allow the liquid to flow out of the bed 10 along the hose. To add liquid, a hose attached to the liquid access hole 38 can be used to pump the liquid under pressure into the bed 10. An alternative to using a pressurized hose would be to have a liquid access hole 38 in the top plate 26 to allow the use of gravity to fill the bed 10.

Figure 4:
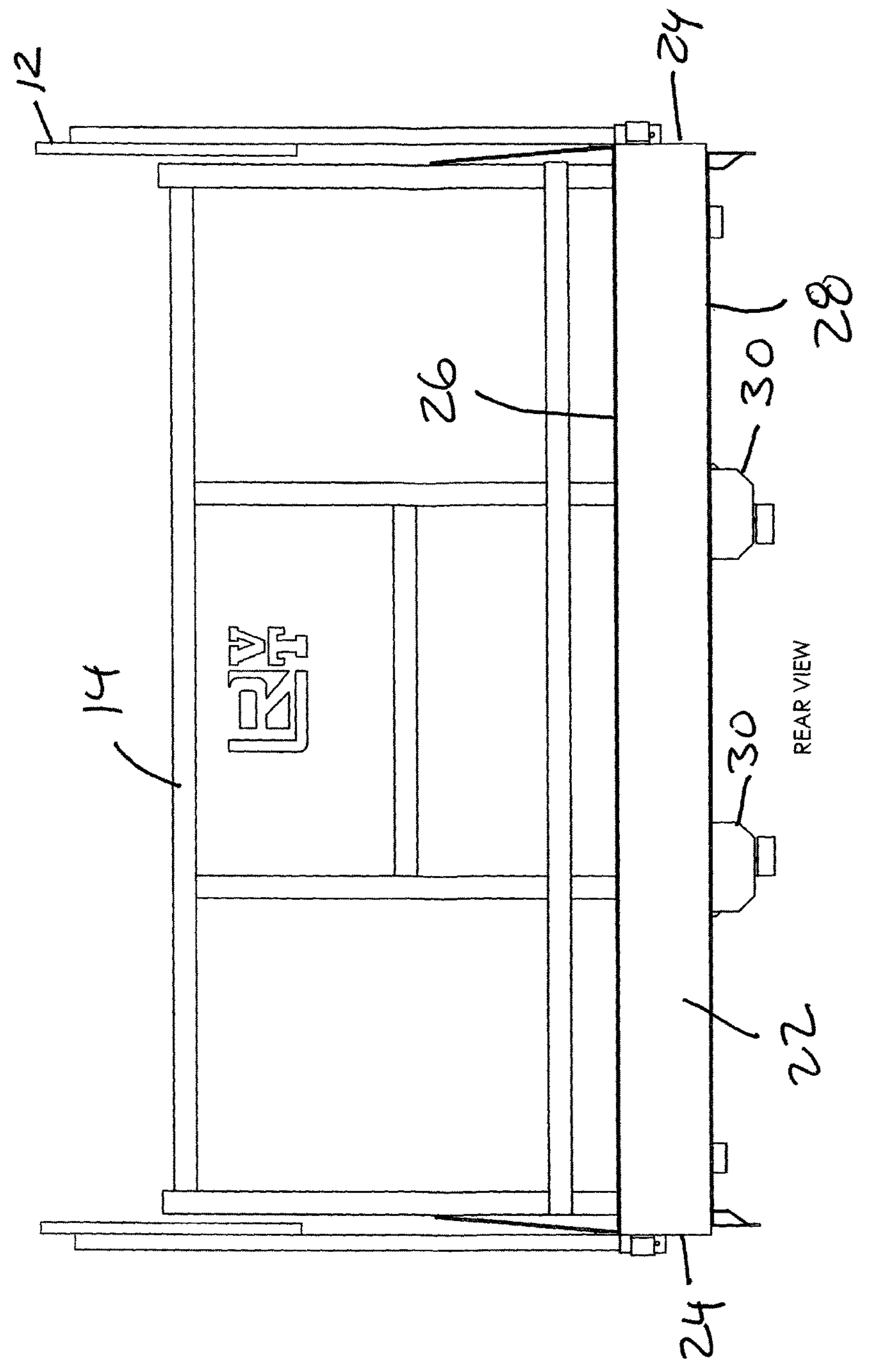
FIG. 4 is a rear view of a truck bed according to the present invention.
Figure 5:
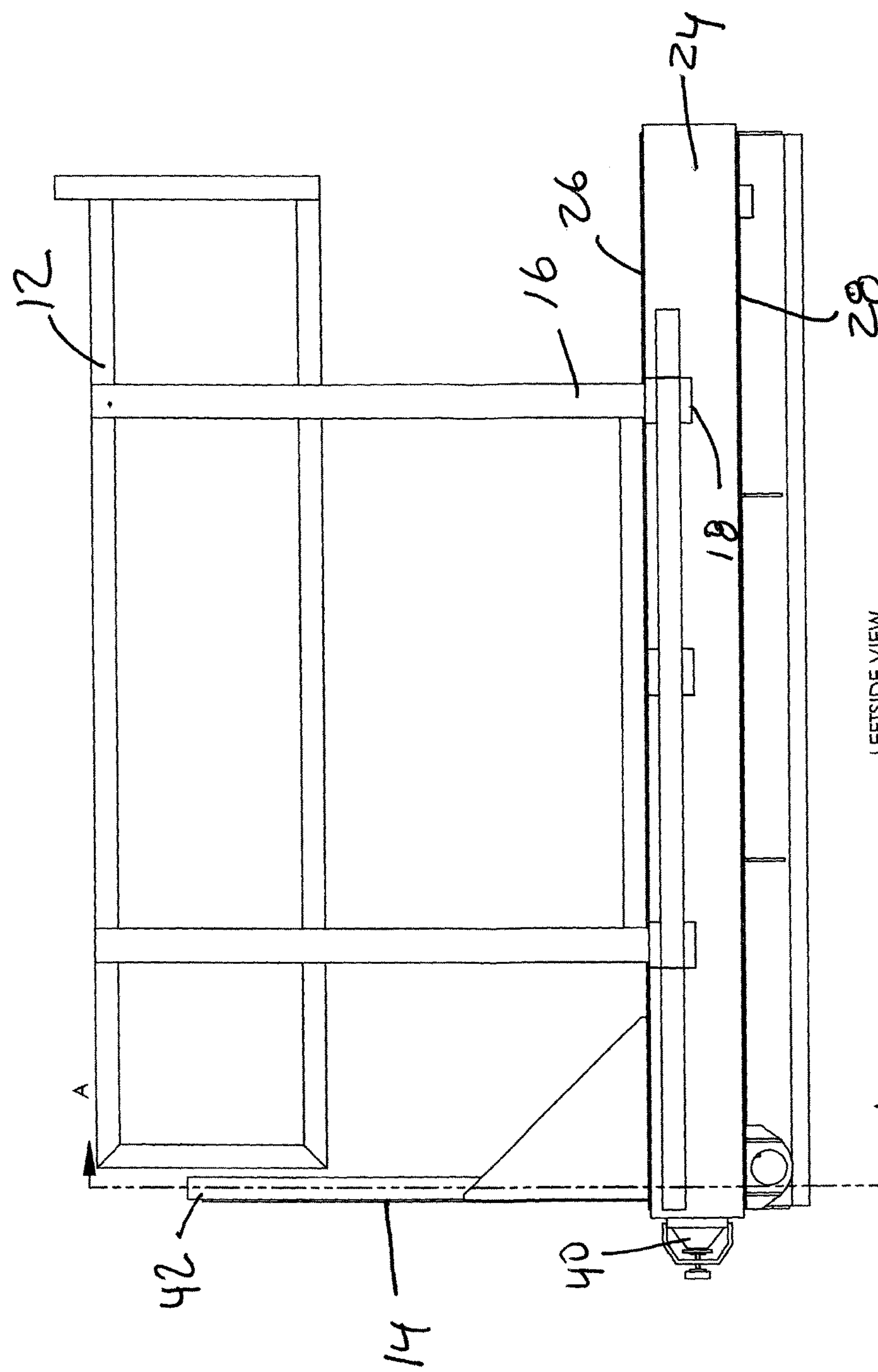
FIG. 5 is a side view of a truck bed according to the present invention.

FIG. 4 shows a rear view of the truck bed 10. FIG. 5 shows a side view of the bed 10. FIG. 5 shows a sight glass 40 that has is attached to an opening in the front end 20 of the bed 10. The sight glass 40 allows the liquid to flow into the sight glass 40 to show how much liquid is in the bed 10. FIG. 6 shows a front end view with the front end 20 and part of the front of the front bulkhead 14 removed. The front bulkhead 14 includes two end uprights 42. The uprights 42 are hollow tubes that connect to an opening 44 in the bed. The connection is shown by detail E, which is enlarged in FIG. 7. The uprights 42 act as vents for the tank form as part of the bed 10 due to the open path from inside the bed 10 and along the uprights 42. The opening path in the uprights 42 can also act a fill point for the bed 10.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A truck bed, comprising:

a flat bed deck adapted for mounting on a truck to haul cargo;

a tank within said deck adapted for containing and hauling liquid;

wherein said deck includes a top plate, bottom plate, front end, rear end and sides, said sides connected between outer edges of said front end and rear end, said top plate connected to said front end, rear end and sides, said bottom plate connected to said front end, rear end and sides, wherein said tank is formed by said top plate, bottom plate, front end, rear end and sides, said sides being connected in a seal state for holding the liquid;

further including baffles in said tank to restrict movement of the liquid;

wherein said baffles run between said sides and said baffles are attached to said sides, top plate and bottom plate, said baffles also providing support for said top plate;

wherein said baffles include flow notches between said bottom plate and said baffles to allow for liquid flow run between said sides; and further including cross baffling members attached between said baffles, said cross baffling members do not contact said bottom plate or said top plate to leave a gap between said bottom plate and top plate to allow the liquid to move.

2. The truck bed of claim 1, wherein said flow notches are V shaped.

3. The truck bed of claim 1, further including at least one outlet for liquid flow in said bottom plate.

4. The truck bed of claim 1, further including at least one vent in said top plate to allow air to escape when filling said tank.

5. The truck bed of claim 1, further including framework mounted around an outside of said deck to retain the cargo.

6. The truck bed of claim 5, further including at least one vent in said framework which leads to said tank.

* * * * *